United States Patent
Hsieh

(10) Patent No.: US 7,542,057 B2
(45) Date of Patent: Jun. 2, 2009

(54) METHOD FOR SIMULTANEOUSLY ADJUSTING BRIGHTNESS AND CONTRAST OF A DISPLAY

(75) Inventor: Kuan-Hong Hsieh, Tu-Chen (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 689 days.

(21) Appl. No.: 11/060,966

(22) Filed: Feb. 17, 2005

(65) Prior Publication Data

US 2005/0179639 A1    Aug. 18, 2005

(30) Foreign Application Priority Data

Feb. 17, 2004    (TW) .................... 93103692

(51) Int. Cl.
G09G 5/10    (2006.01)
G09G 3/36    (2006.01)

(52) U.S. Cl. ...................... 345/690; 345/102

(58) Field of Classification Search ............... 345/617, 345/690, 77, 102, 12, 20, 63
See application file for complete search history.

(56) References Cited

U.S. PATENT DOCUMENTS

| | | | |
|---|---|---|---|
| 4,415,921 A * | 11/1983 | Mulvanny et al. .......... 348/191 |
| 5,406,305 A * | 4/1995 | Shimomura et al. ......... 345/102 |
| 6,239,782 B1 | 5/2001 | Siegel | |
| 6,611,249 B1 * | 8/2003 | Evanicky et al. ............ 345/102 |
| 6,618,045 B1 * | 9/2003 | Lin ............................ 345/207 |
| 6,961,044 B2 * | 11/2005 | Woo .......................... 345/102 |
| 7,193,597 B2 * | 3/2007 | Sunohara .................... 345/98 |
| 2002/0024529 A1 | 2/2002 | Miller et al. | |

* cited by examiner

Primary Examiner—Chanh Nguyen
Assistant Examiner—Calvin C Ma
(74) Attorney, Agent, or Firm—Wei Te Chung

(57) ABSTRACT

An apparatus for simultaneously adjusting brightness and contrast of a display includes: a key (1) for receiving a luminance instruction inputted by a user; an SCM (Single Chip Microprocessor) (2) for obtaining a luminance value corresponding to the instruction, and for calculating a brightness value and a contrast value according to the obtained luminance value; an AID (Analog/Digital) converter (3) for converting the brightness value and the contrast value into respective voltage pulse signals; a signal amplifier (4) for adjusting the amplitude sizes of the voltage pulse signals, and outputting the voltage pulse signals as LVDS (Low Voltage Differential Signals); a back light controller (5) for receiving the LVDS, and controlling video output of the adjusted brightness and contrast; a display screen (6) for displaying luminance values and images according to the adjusted brightness and the contrast; and a power source (7). A related method is also disclosed.

4 Claims, 3 Drawing Sheets

METHOD FOR SIMULTANEOUSLY ADJUSTING BRIGHTNESS AND CONTRAST OF A DISPLAY

BACKGROUND OF THE INVENTION

1. Field of the Invention

The present invention relates generally to apparatuses and methods for adjusting brightness and contrast of electronic displays, and especially to an apparatus and method for adjusting brightness and contrast in a display device by operating a single key.

2. Description of the Related Art

A display is a very important part of a typical image output apparatus. Various kinds of displays include CRT (Cathode-Ray Tube) displays, LCDs (Liquid Crystal Displays), and PDPs (Plasma Display Panels). In typical LCDs, the display function is supported by a back light. The brightness of the back light determines the brightness of images shown on the display. The contrast of an image means the degree of difference between the light and dark parts of the image. In theory, the higher the brightness of the display, the better the image is; and if the contrast is one hundred percent, the display can clearly provide an abundance of different colors. Accordingly, adjustment of brightness and contrast has a tremendous impact on the quality of the image.

Modern displays generally provide for separate adjustment of brightness and contrast. However, some displays provide adjusting of brightness and contrast via a single knob. For example, in the TDS-7xxD series oscilloscopes manufactured by Tektronix Inc, the contrast and brightness functions are controlled via a single knob, which is assigned to each function by means of a menu-prompted choice. From the user's point of view, control of these functions is essentially the same as having two knobs, one for brightness and one for contrast. The single knob does not provide simultaneous adjusting of both contrast and brightness in a single operation.

The art of adjusting brightness and contrast in a monitor is disclosed in publications such as U.S. Pat. No. 6,239,782 entitled "Single Knob Intensity Control For Use In Digital Test And Measurement Equipment" and issued on Mar. 29, 2001. This patent provides an apparatus and method used in a test and measurement instrument for simultaneously adjusting both contrast and brightness via a single knob. The method employs a family of modified gamma curves each having multiple breakpoints for mapping multiple-byte pixel intensity words into a multi-bit pixel intensity display control word. A single user-operable intensity control accomplishes selection of a particular gamma curve from the family of gamma curves, and actuates the simultaneous adjustment of both contrast and brightness.

However, the apparatus described in the patent requires that the pixel intensity values of the curves be stored in the memory of the apparatus in advance. In addition, the apparatus needs to compare the brightness value obtained from the single knob with inputted pixel intensity values. This greatly increases the burden placed on the operating hardware, and makes the apparatus difficult to operate.

What is needed is an apparatus and method for simultaneously adjusting brightness and contrast which can overcome the above-described problems.

SUMMARY OF THE INVENTION

A main objective of the present invention is to provide an apparatus and method which can simultaneously adjust brightness and contrast in a display device via operation of a single key.

To achieve the above objective, the present invention provides an apparatus for simultaneously adjusting brightness and contrast of a display. The apparatus comprises a key for receiving a luminance instruction inputted by a user; an SCM (Single Chip Microprocessor) comprising a luminance obtaining module for obtaining a luminance value corresponding to the instruction, a brightness calculating module for calculating a brightness value according to the obtained luminance value and a predetermined equation, and a contrast calculating module for calculating a contrast value according to the obtained luminance value and a predetermined equation; an A/D (Analog/Digital) converter for converting the brightness value and the contrast value into their respective voltage pulse signals; a signal amplifier for adjusting the amplitude size of the voltage pulse signals, and outputting the voltage pulse signals as LVDS (Low Voltage Differential Signals); a back light controller for receiving the LVDS and controlling video output of the adjusted brightness and contrast; a display screen for displaying luminance values and images according to the adjusted brightness and contrast; and a power source for providing electricity for the apparatus.

Further, the present invention provides a method for simultaneously adjusting brightness and contrast of a display. The method comprises the steps of: (a) receiving a luminance instruction inputted by a user; (b) obtaining a luminance value corresponding to the instruction; (c) calculating a brightness value and a contrast value according to the obtained luminance value and predetermined equations; (d) converting the brightness value and the contrast value into respective voltage pulse signals; (e) adjusting the amplitude sizes of the voltage pulse signals; (f) outputting the voltage pulse signals as LVDS; (g) receiving the LVDS and controlling video output of the adjusted brightness and contrast; and (h) displaying images according to the adjusted brightness and contrast.

Other objects, advantages and novel features of the present invention will be drawn from the following detailed description of a preferred embodiment and preferred method of the present invention with the attached drawings, in which:

DETAILED DESCRIPTION OF THE PREFERRED EMBODIMENT

Figure 1:
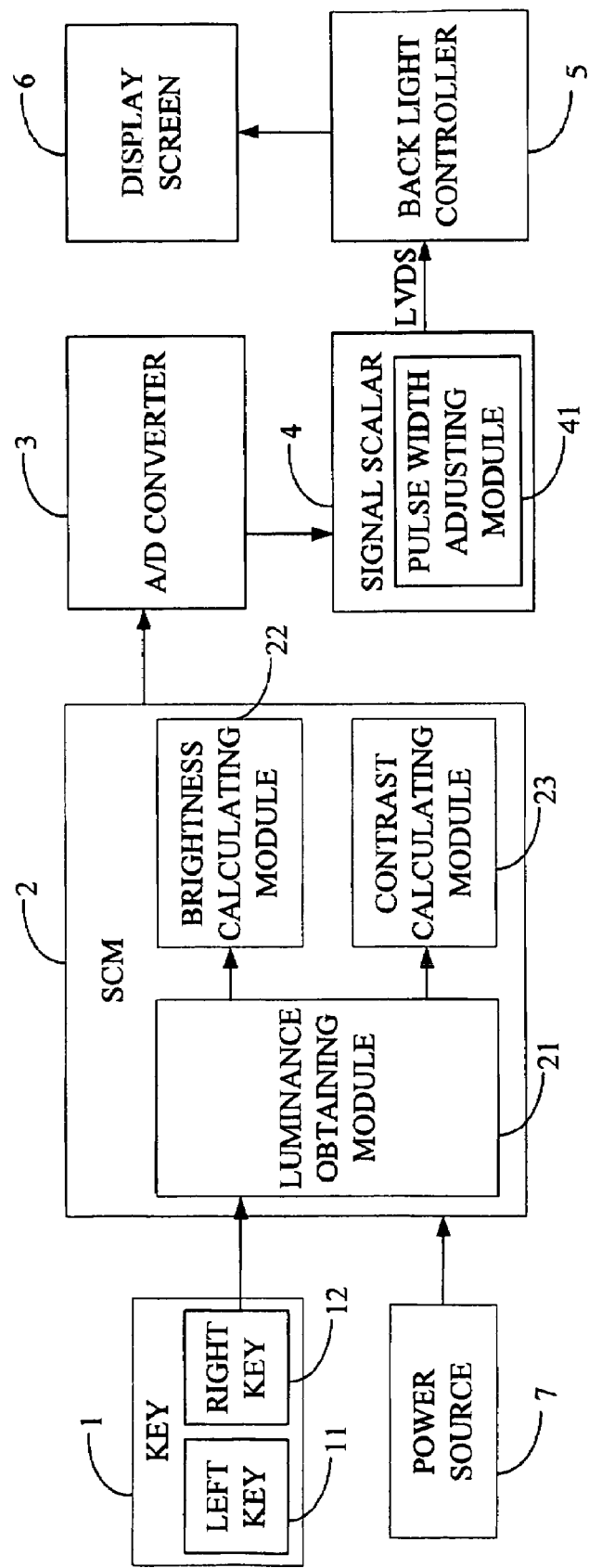
FIG. 1 is a schematic diagram of hardware configuration of an apparatus for simultaneously adjusting brightness and contrast of a display in accordance with a preferred embodiment of the present invention.

FIG. 1 is a schematic diagram of hardware configuration of an apparatus for simultaneously adjusting brightness and contrast of a display (hereinafter, "the apparatus") in accordance with the preferred embodiment of the present invention. The apparatus comprises a key 1, a SCM (Single Chip Microprocessor) 2, an A/D (Analog/Digital) converter 3, a signal amplifier 4, a back light controller 5, a display screen 6, and a power source 7. The key 1 is provided for receiving a luminance instruction inputted by a user, and comprises a left key 11 and a right key 12. The left key 11 is provided for the user to decrease luminance. The right key 12 is provided for the user to increase luminance. The SCM 2 is provided for obtaining a luminance value corresponding to the received instruction, and for calculating a brightness value and a contrast value according to the obtained luminance value. Accordingly, the SCM 2 comprises a luminance obtaining module 21, a brightness calculating module 22, and a contrast calculating module 23. The A/D converter 3 is provided for converting the brightness value and the contrast value into respective voltage pulse signals. The signal amplifier 4 comprises a pulse width adjusting module 41 for adjusting the amplitude size of the voltage pulse signals, and outputting the voltage pulse signals to the back light controller 5 as low voltage differential signals (LVDS). The back light controller 5 is provided for receiving the LVDS, and controlling their video output. The display screen 6 displays luminance values and images according to the adjusted brightness and contrast. The power source 7 provides electricity for the apparatus.

Figure 2B:
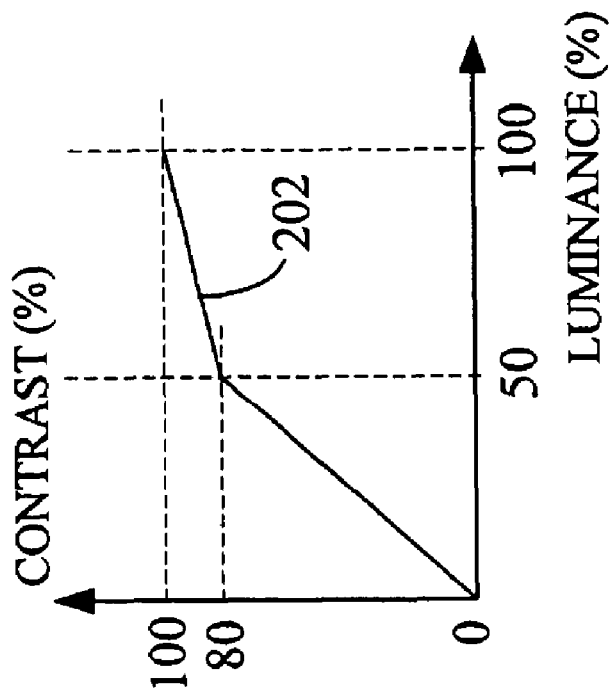
FIGS. 2A and 2B are graphs representing functional equations for respectively calculating brightness values and contrast values according to luminance values obtained using the present invention.
Figure 2A:
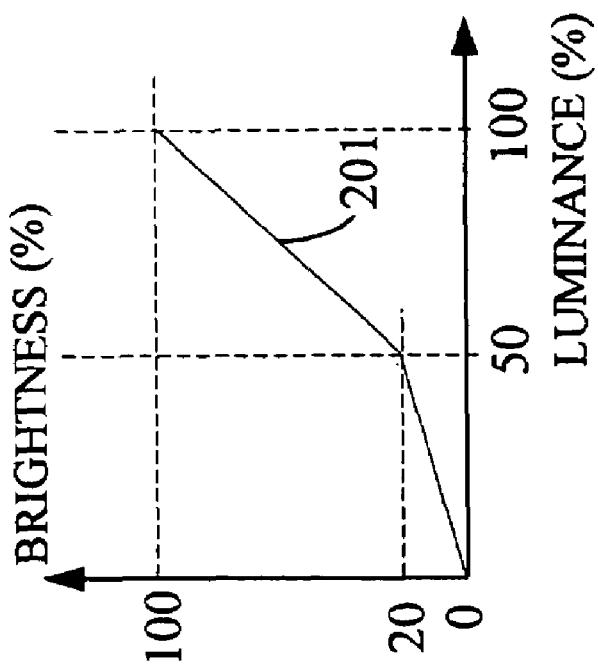

FIGS. 2A and 2B are graphs representing functional equations for respectively calculating brightness values and contrast values according to obtained luminance values. The plot 201 depicts the functional relation between the brightness values and the luminance values, in which the x-axis represents the luminance values, and the y-axis represents the brightness values. After the luminance obtaining module 21 obtains a luminance value, the brightness calculating module 22 calculates a brightness value according to the formula represented by the plot 201. Specifically, when the luminance value is less than 50 percent, the equation used to calculate the corresponding brightness value is: $y=(x*2.sup.1)/5$; where "x" represents the luminance value, "y" represents the brightness value, ".sup." is a power operation symbol, and "2.sup.1" means "$2^1$". When the luminance value is equal to or greater than 50 percent, the equation used to calculate the corresponding brightness value is: $y=20\%+(((x-50\%)*2.sup.3)/5)$. The plot 202 depicts the functional relation between the contrast values and the luminance values, in which the x-axis represents the luminance values, and the y-axis represents the contrast values. After the luminance obtaining module 21 obtains a luminance value, the contrast calculating module 23 calculates a contrast value according to the formula represented by the plot 202. Specifically, when the luminance value is less than 50 percent, the equation used to calculate the corresponding contrast value is: $y'=(x*2.sup.3)/5$; where "x" represents the luminance value, and "y'" represents the contrast value. When the luminance value is equal to or greater than 50 percent, the equation used to calculate the corresponding contrast value is: $y'=80\%+(((x-50\%)*2.sup.1)/5)$.

FIGS. 2A and 2B show that when the obtained luminance value is in the range from 0 to 50 percent, the brightness value is in the range from 0 to 20 percent and the contrast value is in the range from 0 to 80 percent. When the obtained luminance value is in the range from 50 percent to 100 percent, the brightness value is in the range from 20 percent to 100 percent and the contrast value is in the range from 80 percent to 100 percent. The corresponding programming pseudo-codes for calculating the brightness value and the contrast value according to the luminance value are as follows:

```
If (luminance ≦50%)
    {
    Brightness = (luminance <<1) /5;
    Contrast = (luminance <<3) /5;
    }
If (luminance >50%)
    {
    Brightness = 20% + ((luminance − 50%) <<3) /5;
    Contrast = 80% + ((luminance − 50%) <<1) /5;
    }
```

The operator "<<n" is equal to the power operation "$2^n$", where n can be one or three. For example, if the luminance value is 25 percent, the brightness calculating module 22 calculates that the brightness value is 10 percent, in accordance with the formula: Brightness=(luminance<<1)/5. The contrast calculating module 23 calculates that the contrast is 40 percent, in accordance with the formula: Contrast=(luminance<<3)/5.

The following chart lists a group of luminance values and their respective brightness values and contrast values calculated according to the above-described equations:

| Luminance | 0 | 6 | 12 | 18 | 25 | 31 | 37 | 43 | 50 | 57 | 65 | 72 | 80 | 85 | 90 | 95 | 100 |
|---|---|---|---|---|---|---|---|---|---|---|---|---|---|---|---|---|---|
| Brightness | 0 | 2 | 5 | 7 | 10 | 12 | 15 | 17 | 20 | 32 | 44 | 56 | 68 | 76 | 84 | 92 | 100 |
| Contrast | 0 | 10 | 20 | 30 | 40 | 50 | 60 | 70 | 80 | 83 | 86 | 89 | 90 | 92 | 94 | 98 | 100 |

Figure 3:
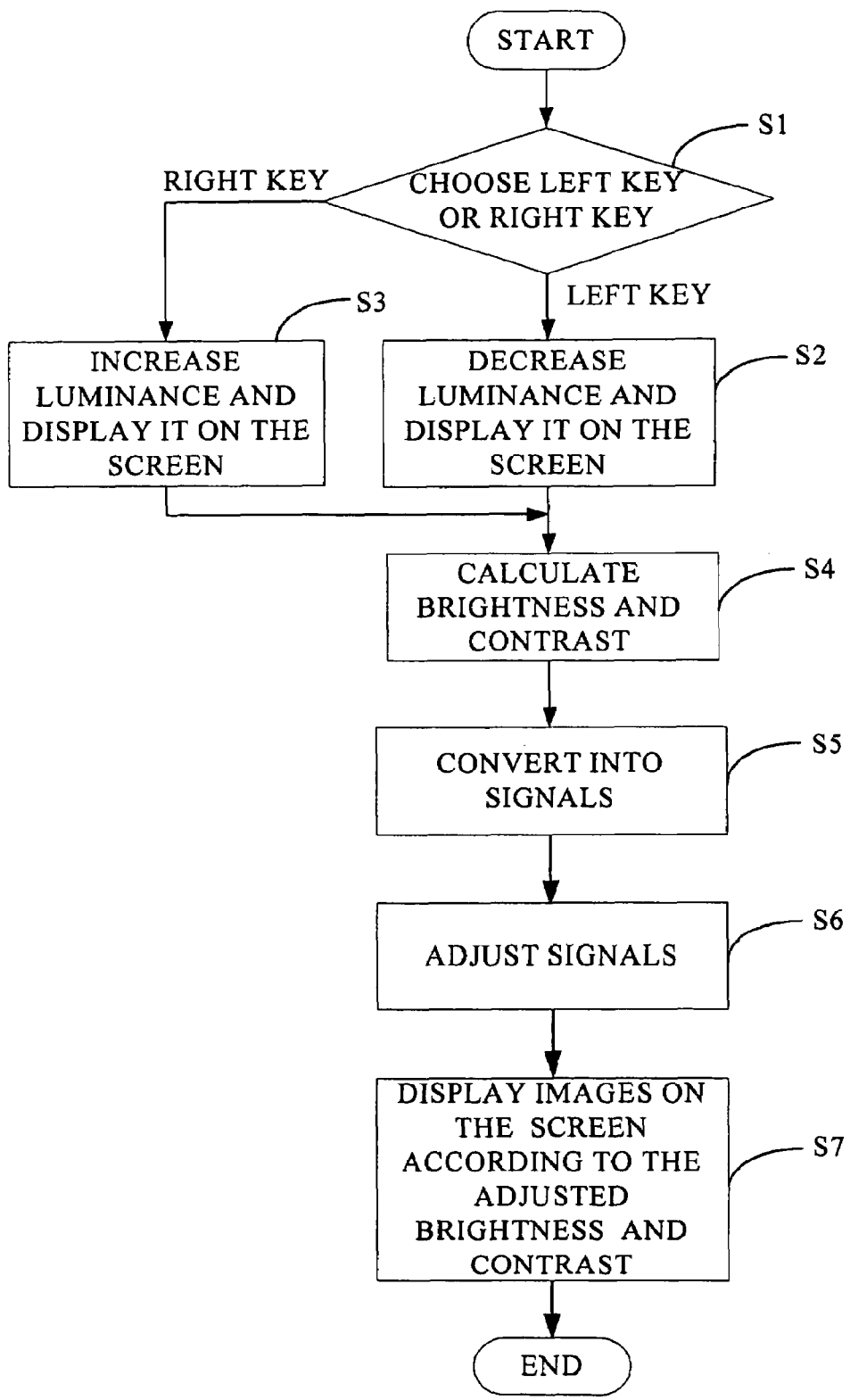
FIG. 3 is a flowchart of a preferred method for simultaneously adjusting brightness and contrast of a display in accordance with the present invention.

FIG. 3 is a flowchart of the preferred method for simultaneously adjusting brightness and contrast of a display by implementing the apparatus. In step S1, a user chooses the left key 11 or the right key 12 of the key 1 for decreasing or increasing luminance. If the user chooses the left key 11, in step S2, the luminance obtaining module 21 obtains a value for decreasing the luminance, and displays the new luminance value on the display screen 6. If the user chooses the right key 12, in step S3, the luminance obtaining module 21 obtains a value for increasing the luminance, and displays the new luminance value on the display screen 6. In step S4, the brightness calculating module 22 calculates a brightness value according to the luminance value and the equation represented by the broken line diagram 201. Simultaneously, the contrast calculating module 23 calculates a contrast value according to the luminance value and the equation represented by the broken line diagram 202. In step S5, the A/D converter 3 converts the brightness value and the contrast value into respective voltage pulse signals. In step S6, the pulse width adjusting module 41 adjusts the amplitude sizes of the voltage pulse signals, and outputs the voltage pulse signals to the back light controller 5 as LVDS. In step S7, the back light controller 5 receives the LVDS, controls the video output of the adjusted brightness and contrast, and displays images on the display screen 6 according to the adjusted brightness and contrast.

Although the present invention has been specifically described on the basis of a preferred embodiment and preferred method, the invention is not to be construed as being limited thereto. Various changes or modifications may be made to the embodiment and method without departing from the scope and spirit of the invention.

What is claimed is:

1. A method for simultaneously adjusting brightness and contrast of a display, comprising the steps of:
   receiving a luminance instruction inputted by a user;
   obtaining a luminance value corresponding to the luminance instruction;
   calculating a brightness value and a contrast value by a predetermined function in response to the obtained luminance value, wherein the predetermined function comprising an equation used to calculate the brightness value is: brightness value=(luminance value *2.sup.1)/5, when the luminance value is less than 50 percent;
   converting the brightness value and the contrast value into respective voltage pulse signals;
   adjusting the amplitude sizes of the voltage pulse signals;
   outputting the voltage pulse signals as LVDS (Low Voltage Differential Signals);
   receiving the LVDS and controlling output of the adjusted brightness and contrast; and
   displaying images according to the adjusted brightness and contrast.

2. A method for simultaneously adjusting brightness and contrast of a display, comprising the steps of:
   receiving a luminance instruction inputted by a user;
   obtaining a luminance value corresponding to the luminance instruction;
   calculating a brightness value and a contrast value by a predetermined function in response to the obtained luminance value, wherein the predetermined function comprising an equation used to calculate the brightness value is: brightness value=20%+(((luminance value-50%)*2.sup.3)/5), when the luminance value is equal to or greater than 50 percent;
   converting the brightness value and the contrast value into respective voltage pulse signals;
   adjusting the amplitude sizes of the voltage pulse signals;
   outputting the voltage pulse signals as LVDS (Low Voltage Differential Signals);
   receiving the LVDS and controlling output of the adjusted brightness and contrast; and
   displaying images according to the adjusted brightness and contrast.

3. A method for simultaneously adjusting brightness and contrast of a display, comprising the steps of:
   receiving a luminance instruction inputted by a user;
   obtaining a luminance value corresponding to the luminance instruction;
   calculating a brightness value and a contrast value by a predetermined function in response to the obtained luminance value, wherein the predetermined function comprising an equation used to calculate the contrast value is: contrast value=(luminance value*2. sup.3)/5, when the luminance value is less than 50 percent;
   converting the brightness value and the contrast value into respective voltage pulse signals;
   adjusting the amplitude sizes of the voltage pulse signals;
   outputting the voltage pulse signals as LVDS (Low Voltage Differential Signals);
   receiving the LVDS and controlling output of the adjusted brightness and contrast; and
   displaying images according to the adjusted brightness and contrast.

4. A method for simultaneously adjusting brightness and contrast of a display, comprising the steps of:
   receiving a luminance instruction inputted by a user;
   obtaining a luminance value corresponding to the luminance instruction;
   calculating a brightness value and a contrast value by a predetermined function in response to the obtained luminance value, wherein the predetermined function comprising an equation used to calculate the contrast value is: contrast value=80% +(((luminance value 50%)*2.sup.1)/5), when the luminance value is equal to or greater than 50 percents;
   converting the brightness value and the contrast value into respective voltage pulse signals;
   adjusting the amplitude sizes of the voltage pulse signals;
   outputting the voltage pulse signals as LVDS (Low Voltage Differential Signals;
   receiving the LVDS and controlling output of the adjusted brightness and contrast; and
   displaying images according to the adjusted brightness and contrast.

* * * * *